(12) United States Patent
Yamamoto et al.

(10) Patent No.: US 12,271,128 B2
(45) Date of Patent: Apr. 8, 2025

(54) IMAGE FORMING APPARATUS PROVIDED WITH AN INTERMEDIATE TRANSFER BELT AND MEANDERING PREVENTION PULLEY

(71) Applicant: KYOCERA Document Solutions Inc., Osaka (JP)

(72) Inventors: Koju Yamamoto, Osaka (JP); Takashi Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/402,156

(22) Filed: Jan. 2, 2024

(65) Prior Publication Data

US 2024/0231260 A1     Jul. 11, 2024

(30) Foreign Application Priority Data

Jan. 6, 2023   (JP) ................. 2023-000941

(51) Int. Cl.
*G03G 15/00*   (2006.01)
*B65G 39/071*  (2006.01)
*G03G 15/16*   (2006.01)

(52) U.S. Cl.
CPC ....... *G03G 15/1615* (2013.01); *B65G 39/071* (2013.01); *G03G 2215/00151* (2013.01);
(Continued)

(58) Field of Classification Search
CPC ....... G03G 15/1615; G03G 2215/1623; G03G 2215/00143; G03G 2215/00151; G03G 2215/00168; B65G 39/071; B65G 39/16; B65G 2812/02168

USPC ........ 399/302, 308; 198/806, 808; 474/109, 474/114, 119, 122, 140, 158, 159, 160, 474/171, 172

See application file for complete search history.

(56) References Cited

U.S. PATENT DOCUMENTS

| | | | | |
|---|---|---|---|---|
| 6,088,566 A | * | 7/2000 | Todome | G03G 15/0131 198/837 |
| 2003/0035661 A1 | * | 2/2003 | Kabata | G03G 15/755 399/162 |

(Continued)

FOREIGN PATENT DOCUMENTS

| | | | | |
|---|---|---|---|---|
| JP | 08106218 A | * | 4/1996 | |
| JP | 2000255821 A | * | 9/2000 | G03G 15/167 |

(Continued)

*Primary Examiner* — Robert B Beatty
(74) *Attorney, Agent, or Firm* — Stein IP, LLC

(57) ABSTRACT

Provided is an image forming apparatus including: an image bearing member which is configured to bear a toner image; an intermediate transfer belt; a transfer roller; a drive roller; a driven roller; a meandering prevention pulley; and a meandering prevention belt. The meandering prevention pulley is arranged to face an end surface of the driven roller in an axial direction of the driven roller. The meandering prevention belt is arranged on an outside in the axial direction relative to the meandering prevention pulley, and protrudes from an inner peripheral surface of the intermediate transfer belt. The meandering prevention pulley has a guide surface which faces the meandering prevention belt in the axial direction, and which is formed to have a surface roughness (Ra) of 0.5 μm or more.

5 Claims, 2 Drawing Sheets

(52) U.S. Cl.
CPC ............ *G03G 2215/00168* (2013.01); *G03G 2215/1623* (2013.01)

(56) References Cited

U.S. PATENT DOCUMENTS

| | | | |
|---|---|---|---|
| 2013/0343794 A1* | 12/2013 | Takifuji | B65G 15/60 198/837 |
| 2015/0309457 A1* | 10/2015 | Gon | G03G 15/2053 399/329 |
| 2020/0301321 A1* | 9/2020 | Kumagai | G03G 15/1615 |

FOREIGN PATENT DOCUMENTS

| | | | | |
|---|---|---|---|---|
| JP | 2005-242121 A | | 9/2005 | |
| JP | 2008009287 A | * | 1/2008 | ........... G03G 15/162 |

\* cited by examiner

IMAGE FORMING APPARATUS PROVIDED WITH AN INTERMEDIATE TRANSFER BELT AND MEANDERING PREVENTION PULLEY

INCORPORATION BY REFERENCE

This application is based on and claims the benefit of priority from Japanese Patent Application No. 2023-000941 filed on Jan. 6, 2023, the contents of which are hereby incorporated by reference.

BACKGROUND

The present disclosure relates to an image forming apparatus.

Related-art image forming apparatuses include: an intermediate transfer belt; a drive roller; a driven roller; a meandering prevention pulley; and a meandering prevention belt.

The intermediate transfer belt transfers a toner image formed on an image bearing member.

The drive roller drives the intermediate transfer belt with the intermediate transfer belt stretched therearound.

The driven roller supports the intermediate transfer belt in a manner that allows the intermediate transfer belt to rotate.

The meandering prevention pulley is arranged to face an end surface of the driven roller in an axial direction of the driven roller.

The meandering prevention belt
is arranged on an outside in the axial direction relative to the meandering prevention pulley, and
protrudes from an inner peripheral surface of the intermediate transfer belt. In a case where the intermediate transfer belt meanders in the axial direction, the meandering prevention belt comes into contact with a guide surface of the meandering prevention pulley. With this, the intermediate transfer belt is restricted from meandering in the axial direction.

Employment of the related art has a problem that abnormal noise is generated due to the contact between and the guide surface of the meandering prevention pulley and the meandering prevention belt.

SUMMARY

According to an aspect of the present disclosure, there is provided an image forming apparatus including: an image bearing member which is configured to bear a toner image; an intermediate transfer belt; a transfer roller; a drive roller; a driven roller; a meandering prevention pulley; and a meandering prevention belt.

The intermediate transfer belt is configured to transfer the toner image formed on the image bearing member.

The transfer roller is installed to face the image bearing member.

The drive roller is configured to drive the intermediate transfer belt with the intermediate transfer belt stretched around the drive roller.

The driven roller is configured to support the intermediate transfer belt in a manner that allows the intermediate transfer belt to rotate.

The meandering prevention pulley is arranged to face an end surface of the driven roller in an axial direction of the driven roller.

The meandering prevention belt
is arranged on an outside in the axial direction relative to the meandering prevention pulley, and
protrudes from an inner peripheral surface of the intermediate transfer belt.

The meandering prevention pulley has a guide surface
which faces the meandering prevention belt in the axial direction, and
which is formed to have a surface roughness Ra of 0.5 μm or more.

This and other objects of the present disclosure, and the specific benefits obtained according to the present disclosure, will become apparent from the description of embodiments which follows.

DETAILED DESCRIPTION

Figure 1:
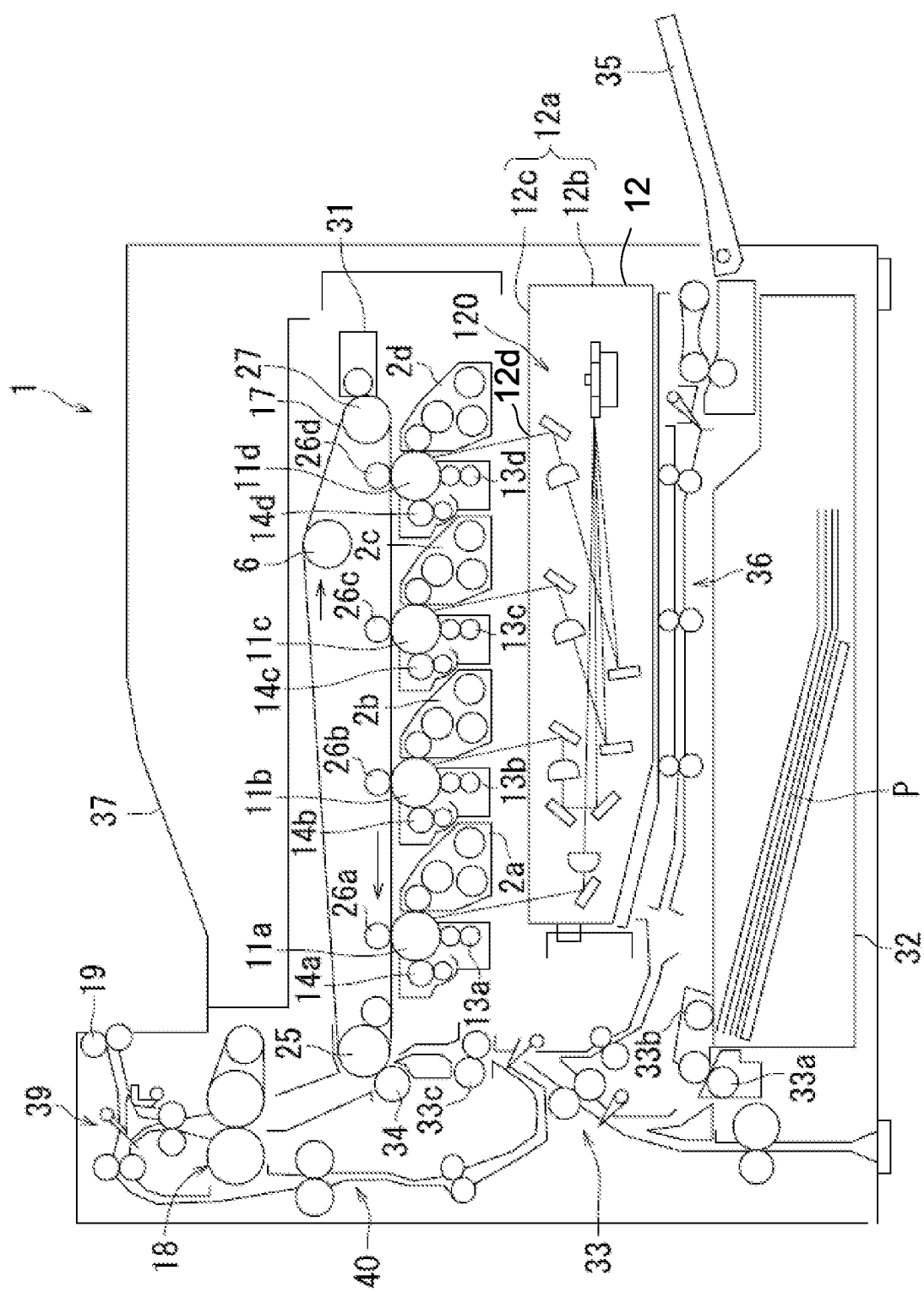
FIG. 1 is a cross-sectional side view of an internal structure of an image forming apparatus 1 according to an embodiment of the present disclosure.

Now, an embodiment of the present disclosure is described with reference to the drawings. FIG. 1 is a schematic cross-sectional view of an overall configuration of an image forming apparatus 1 into which an optical scanning device according to the embodiment of the present disclosure is installed. The image forming apparatus 1 is a tandem-type color printer. The image forming apparatus 1 includes rotatable photosensitive drums 11a, 11b, 11c, and 11d as image bearing members. Photosensitive members such as organic photosensitive members each formed of an organic photosensitive layer (OPC photosensitive members) or amorphous-silicon photosensitive members each formed of an amorphous-silicon photosensitive layer are used as the photosensitive drums 11a to 11d. The photosensitive drums 11a to 11d correspond respectively to magenta, cyan, yellow, and black, and are arranged in tandem.

A developing device 2a, a charger 13a, and a cleaning device 14a are disposed around the photosensitive drum 11a. Similarly, developing devices 2b, 2c, and 2d, chargers 13b, 13c, and 13d, cleaning devices 14b, 14c, and 14d are disposed respectively around the photosensitive drums 11b to 11d. In addition, an optical scanning device 12 is disposed below the developing devices 2a to 2d.

The developing devices 2a to 2d are arranged respectively on the right of the photosensitive drums 11a to 11d. The developing devices 2a to 2d respectively face the photosensitive drums 11a to 11d, and supply toner onto the photosensitive drums 11a to 11d. Note that, the right and the left used herein represent the right and the left in FIG. 1.

The chargers 13a to 13d are arranged respectively on upstream sides relative to the developing devices 2a to 2d in rotation directions of the photosensitive drums 11a to 11d, and respectively face surfaces of the photosensitive drums 11a to 11d. The chargers 13a to 13d uniformly charge the surfaces of the photosensitive drums 11a to 11d, respectively.

The optical scanning device 12 applies light (performs optical scanning) to the surfaces of the photosensitive drums 11a to 11d on the basis of data of images of letters, pictures, and the like, the surfaces have been uniformly charged by the chargers 13a to 13d, the data having been input from, for example, a personal computer to an image input unit. With this, electrostatic latent images are formed on the surfaces of the photosensitive drums 11a to 11d.

A casing 12a of the optical scanning device 12 includes a housing portion 12b having an opening on its one side, and a cover portion 12c that covers this opening. The housing portion 12b incorporates an optical scanning system 120. In the cover portion 12c, emission ports 12d (refer to FIG. 1) for light (laser light) to be emitted from the optical scanning system 120 are formed to correspond to the photosensitive drums 11a to 11d. In addition, the emission ports 12d are covered respectively with transmissive members 52. The transmissive members 52 are transmissive to the light to be emitted from the optical scanning system 120.

The optical scanning system 120 includes a laser light source (not shown) and a polygonal mirror. In addition, the optical scanning system 120 includes an at least one reflecting mirror and an at least one lens corresponding to the photosensitive drums 11a to 11d. The laser light emitted from the laser light source is applied via the polygonal mirror, a reflecting-mirror group, and a lens group onto each of the surfaces of the photosensitive drums 11a to 11d respectively from downstream sides relative to the chargers 13a to 13d in the rotation directions of the photosensitive drums 11a to 11d. With this, the electrostatic latent images are formed on the surfaces of the photosensitive drums 11a to 11d. These electrostatic latent images are developed into toner images by the developing devices 2a to 2d.

An endless intermediate-transfer belt 17 is stretched around a tension roller 6, a drive roller 25, and a driven roller 27. When the drive roller 25 is rotated by a motor (not shown), the driven roller 27 is rotated in accordance therewith about a rotation axis C (refer to FIG. 2). With this, the intermediate transfer belt 17 is driven to circulate clockwise in FIG. 1.

The photosensitive drums 11a to 11d are arrayed adjacent to each other along a conveying direction (direction of arrows in FIG. 1) under the intermediate transfer belt 17. In addition, all the photosensitive drums 11a to 11d are held in contact with the intermediate transfer belt 17. Primary transfer rollers 26a, 26b, 26c, and 26d respectively face the photosensitive drums 11a, 11b, 11c, and 11d with the intermediate transfer belt 17 sandwiched therebetween. All the primary transfer rollers 26a to 26d are held in press-contact with the intermediate transfer belt 17 to form primary transfer sections cooperatively with the photosensitive drums 11a to 11d. In these primary transfer sections, the toner images are transferred onto the intermediate transfer belt 17. Specifically, by application of primary transfer voltage to the primary transfer rollers 26a to 26d, the toner images on the photosensitive drums 11a to 11d are sequentially transferred onto the intermediate transfer belt 17 at predetermined timings. With this, the toner images in the four colors of magenta, cyan, yellow, and black are superimposed on each other in a predetermined positional relationship on a surface of the intermediate transfer belt 17. In this way, a full-color toner image is formed.

A secondary transfer roller 34 faces the drive roller 25 with the intermediate transfer belt 17 sandwiched therebetween. The secondary transfer roller 34 is held in press-contact with the intermediate transfer belt 17 to form a secondary transfer section cooperatively with the drive roller 25. In this secondary transfer section, secondary transfer voltage is applied to the secondary transfer roller 34. With this, the toner images on the intermediate transfer belt 17 are transferred onto paper P. After the toner images have been transferred, a belt cleaning device 31 cleans off residual toner from the intermediate transfer belt 17.

A paper feeding cassette 32 is disposed in a lower side of the image forming apparatus 1. The paper feeding cassette 32 is capable of storing a plurality of sheets of paper P. A stack tray 35 for manual feeding is disposed on the right of the paper feeding cassette 32. A first paper-conveying path 33 is disposed on the left of the paper feeding cassette 32. The first paper-conveying path 33 conveys the paper P that has been fed out of the paper feeding cassette 32 to the secondary transfer section. In addition, a second paper-conveying path 36 is disposed on the left of the stack tray 35. The second paper-conveying path 36 conveys paper that has been fed out of the stack tray 35 to the secondary transfer section. In addition, a fixing section 18 and a third paper-conveying path 39 are disposed on the upper left in the image forming apparatus 1. The fixing section 18 executes a fixing process on the paper P on which images have been formed. The third paper-conveying path 39 conveys the paper P that has been subjected to the fixing process to a paper delivery section 37.

The paper P stored in the paper feeding cassette 32 is fed out one by one by a pick-up roller 33b and a fanning roller pair 33a to a side where the first paper-conveying path 33 is present.

The first paper-conveying path 33 and the second paper-conveying path 36 merge with each other before (on an upstream side relative to) a registration roller pair 33c. The registration roller pair 33c conveys the paper P to the secondary transfer section at an appropriate timing between an operation of the image formation on the intermediate transfer belt 17 and an operation of the paper feeding to the secondary transfer section. By the secondary transfer roller 34 to which the secondary transfer voltage has been applied, the full-color toner image on the intermediate transfer belt 17 is secondarily transferred onto the paper P that has been transferred to the secondary transfer section. The paper P to which the full-color toner image has been transferred is conveyed to the fixing section 18.

The fixing section 18 includes a fixing belt that is heated by a heater, a fixing roller that is held in contact with an inner side of the fixing belt, and a pressure roller that is held in press contact with the fixing roller with the fixing belt sandwiched therebetween. The fixing section 18 heats and presses the paper P to which the toner images have been transferred. In this way, the fixing process is executed. The paper P to which the toner images have been fixed in the fixing section 18 is flipped over as appropriate in a fourth paper-conveying path 40. Then, the paper P is conveyed to the secondary transfer section again through the registration roller pair 33c. Next, new toner images are secondarily transferred onto a back surface of the paper P by the secondary transfer roller 34, and then are fixed in the fixing section 18. The paper P to which the new toner images have been fixed is conveyed through the third paper-conveying path 39, and then delivered to the paper delivery section 37 by a delivery roller pair 19.

Figure 2:
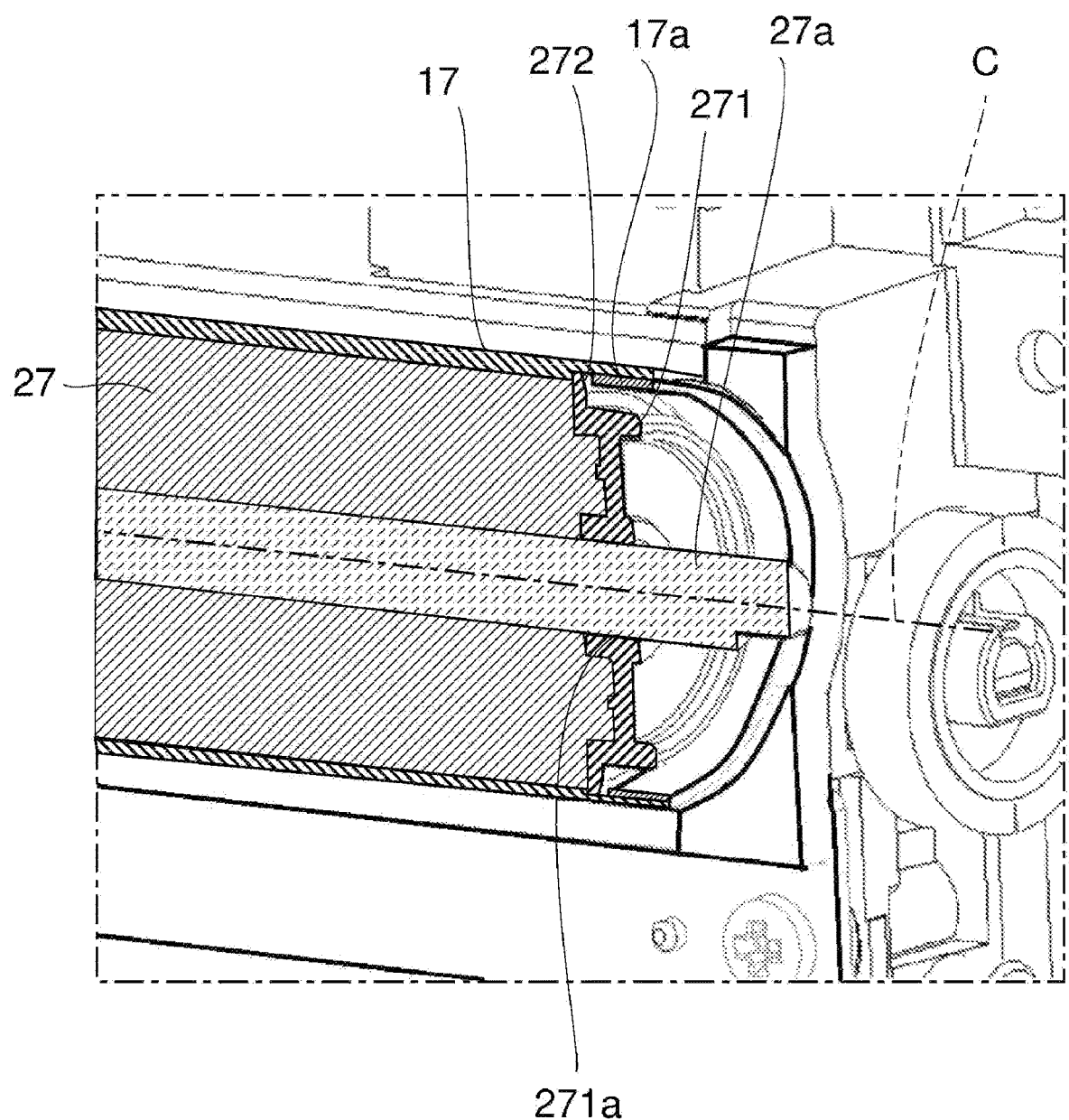
FIG. 2 is a cross-sectional perspective view of a part of an intermediate transfer belt 17 according to the embodiment of the present disclosure, the cross-sectional perspective view being taken along an axial direction.

FIG. 2 is a cross-sectional perspective view of a part of the intermediate transfer belt 17, the cross-sectional perspective view being taken along an axial direction. Note that, in FIG. 2, a direction in which the rotation axis C of the driven roller 27 extends is referred to as the "axial direction," and a direction which is orthogonal to the rotation axis C is referred to as a "radial direction." In addition, a direction about the rotation axis C is referred to as a "circumferential direction."

The image forming apparatus 1 further includes a meandering prevention pulley 271 and a meandering prevention belt 17a. The meandering prevention pulley 271 is attached to each end surface in the axial direction of the driven roller 27.

An outer rim in the axial direction of the intermediate transfer belt 17 is located on an outside in the axial direction relative to a corresponding one of outer rims in the axial direction of a corresponding one of the meandering prevention pullies 271. The meandering prevention belt 17a is arranged on the outside in the axial direction relative to each of the meandering prevention pullies 271, and protrudes from an inner peripheral surface of the intermediate transfer belt 17. In this embodiment, the meandering prevention belt 17a is formed into an annular shape and integrated with the intermediate transfer belt 17. With this, the meandering prevention belt 17a is driven in accordance with the intermediate transfer belt 17 that is driven to circulate.

In this embodiment, the meandering prevention pulley 271 is a disc-shaped resin-molded product. The meandering prevention pulley 271 has a through-hole 271a that is formed through the meandering prevention pulley 271 in the axial direction. A shaft 27a of the driven roller 27 is fitted to the through-hole 271a. With this, the meandering prevention pulley 271 is rotated together with the driven roller 27. Note that, the meandering prevention pulley 271 may be molded from a metal.

The meandering prevention pulley 271 has a guide surface 272 in an outer peripheral portion in the axial direction of its outer surface. The guide surface 272 faces the meandering prevention belt 17a in the axial direction. The guide surface 272 is formed by texturing to have a surface roughness Ra of 0.5 µm or more and 6.8 µm or less. "Ra" represents arithmetic mean roughness according to JIS (Japanese Industrial Standards).

In a case where the intermediate transfer belt 17 meanders in the axial direction, the meandering prevention belt 17a comes into contact with the guide surface 272 of the meandering prevention pulley 271. With this, the intermediate transfer belt 17 is restricted from moving in the axial direction, and hence can be suppressed from meandering.

In this case, if the guide surface 272 has been formed to have the surface roughness Ra of 0.5 µm or more, rotation of the intermediate transfer belt 17 with the meandering prevention belt 17a adhering to the guide surface 272 (adhesion phenomenon) can be prevented. With this, slidability of the meandering prevention belt 17a relative to the guide surface 272 can be enhanced. Therefore, generation of abnormal noise due to the contact between the meandering prevention belt 17a and the guide surface 272 can be suppressed.

In addition, if the guide surface 272 has been formed to have the surface roughness Ra of 6.8 µm or less, the meandering prevention belt 17a can be suppressed from being worn by rubbing against the guide surface 272. Note that, the surface roughness of the guide surface 272 may be adjusted to fall within the above-mentioned range not by texturing but by sanding or blasting. Alternatively, the guide surface 272 may be processed in advance so that irregularities are formed. With this, assembly of the image forming apparatus 1 can be more simplified than in a case where a lubricant containing stearic acid is applied to the guide surface 272.

Now, advantages of the present disclosure are described in detail in Examples and Comparative Examples. In the following experiments, the slidability between the meandering prevention belt 17a and the guide surface 272 was rated, and results of the rating are shown in Table 1.

TABLE 1

| | Type of Irregularity | Material | Surface Roughness Ra (µm) | Static Friction Coefficient | Slidability |
|---|---|---|---|---|---|
| Example 1 | Sanding | POM | 0.5 | 1.8 | ○ |
| Example 2 | Sanding | POM | 3.4 | 1.4 | ○ |
| Example 3 | Sanding | POM | 6.3 | 1.4 | ○ |
| Example 4 | Blasting | POM | 0.9 | 1.8 | ○ |
| Example 5 | Blasting | POM | 3.5 | 1.4 | ○ |
| Example 6 | Blasting | POM | 6.8 | 1.6 | ○ |
| Example 7 | Texturing | PC + ABS | 1.7 | 2.8 | ○ |
| Example 8 | Texturing | PC + ABS | 2.4 | 2.4 | ○ |
| Example 9 | Texturing | PC + ABS | 3.3 | 2.4 | ○ |
| Comparative Example 1 | No Processing | POM | 0.02 | 20 or more | x |
| Comparative Example 2 | No Processing | PC + ABS | 0.17 | 20 or more | x |

In Example 1 to Example 9 and Comparative Example 1 and Comparative Example 2, test pieces each having a size of 100 mm×10 mm were used. In Example 1 to Example 3, the test pieces were each formed of a polyacetal resin (POM), and a surface of each of the test pieces was sanded. In Example 4 to Example 6, the test pieces were each formed of a polyacetal resin (POM), and a surface of each of the test pieces was blasted. In Example 7 to Example 9, the test pieces were each formed of a polycarbonate and acrylonitrile butadiene styrene mixed resin (PC+ABS), and a surface of each of the test pieces was textured.

In Comparative Example 1, a test piece was formed of a polyacetal resin (POM), and a surface of the test piece was not processed. In Comparative Example 2, a test piece was formed of a polycarbonate and acrylonitrile butadiene styrene mixed resin (PC+ABS), and a surface of the test piece was not processed.

A surface roughness Ra of the test piece according to Example 1 was 0.5 µm. A surface roughness Ra of the test piece according to Example 2 was 3.4 µm. A surface roughness Ra of the test piece according to Example 3 was 6.3 µm. A surface roughness Ra of the test piece according to Example 4 was 0.9 µm. A surface roughness Ra of the test piece according to Example 5 was 3.5 µm. A surface roughness Ra of the test piece according to Example 6 was 6.8 µm. A surface roughness Ra of the test piece according to Example 7 was 1.7 µm. A surface roughness Ra of the test piece according to Example 8 was 2.4 µm. A surface roughness Ra of the test piece according to Example 9 was 3.3 µm. A surface roughness Ra of the test piece according to Comparative Example 1 was 0.02 µm. A surface roughness Ra of the test piece according to Comparative Example 2 was 0.17 µm.

A test belt formed of the same material as that of the intermediate transfer belt 17 was set on each of the test pieces according to Example 1 to Example 9 and Comparative Example 1 and Comparative Example 2, and a weight of 50 g was set on the test belt so that the weight was superimposed on each of the test pieces in top view. Then, the test belt was pulled in a horizontal direction, and a static friction coefficient of each of the test pieces according to Example 1 to Example 9 and Comparative Example 1 and Comparative Example 2 was measured to check the slidability.

Circles in Table 1 represent significantly high slidability. Crosses in Table 1 represent low slidability.

As shown in Table 1, in Example 1 to Example 9, since the surfaces were processed to have irregularities, the static friction coefficients fell within a range from 1.4 or more to 2.8 or less. The adhesion phenomenon was not found between the test belt and any of the test pieces, that is, the slidability was high. Meanwhile, in Comparative Example 1 and Comparative Example 2, the static friction coefficients were 20 or more, and the adhesion phenomenon was found between the test belt and each of the test pieces. Therefore, the slidability was low.

These results demonstrated that, when the guide surface 272 was formed to have the surface roughness Ra of 0.5 μm or more and 6.8 μm or less, the slidability between the guide surface 272 and the meandering prevention belt 17a was enhanced, and generation of abnormal noise was successfully suppressed.

The above-described embodiment is merely an example of the present disclosure. The configuration of the embodiment may be modified as appropriate within the scope of the technical idea of the present disclosure. In addition, embodiments may be carried out in possible combinations.

The present disclosure can be utilized in image forming apparatuses including intermediate transfer belts.

What is claimed is:

1. An image forming apparatus, comprising:
   an image bearing member which is configured to bear a toner image;
   an intermediate transfer belt which is configured to transfer the toner image formed on the image bearing member;
   a transfer roller which is installed to face the image bearing member;
   a drive roller which is configured to drive the intermediate transfer belt with the intermediate transfer belt stretched around the drive roller;
   a driven roller which is configured to support the intermediate transfer belt in a manner that allows the intermediate transfer belt to rotate;
   a meandering prevention pully which is arranged to face an end surface of the driven roller in an axial direction of the driven roller; and
   a meandering prevention belt
   which is arranged on an outside in the axial direction relative to the meandering prevention pully, and
   which protrudes from an inner peripheral surface of the intermediate transfer belt, the meandering prevention pully having a guide surface
   which faces the meandering prevention belt in the axial direction, and
   which is formed to have a surface roughness Ra 0.9 μm or more and a static friction coefficient of 1.4 or more.

2. The image forming apparatus according to claim 1, wherein the guide surface is formed to have a surface roughness Ra of 6.8 μm or less.

3. The image forming apparatus according to claim 1, wherein the guide surface of the meandering prevention pully is textured.

4. The image forming apparatus according to claim 1, wherein the guide surface of the meandering prevention pully is blasted.

5. The image forming apparatus according to claim 1, wherein the guide surface of the meandering prevention pully is sanded.

\* \* \* \* \*